June 21, 1960 — E. F. PAULUS — 2,941,513
SPEED CONTROL FOR OSCILLATING HYDRAULIC MOTORS
Filed March 28, 1957 — 2 Sheets-Sheet 1
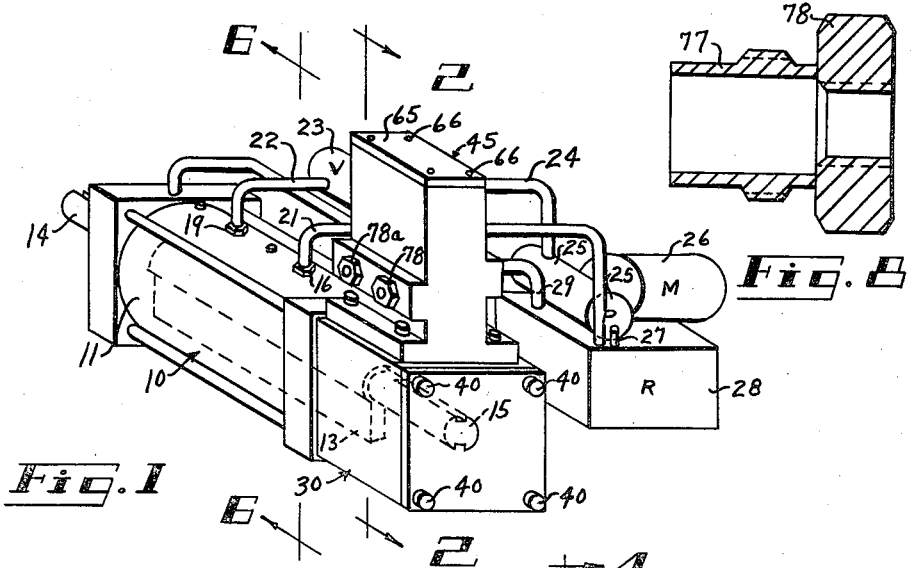
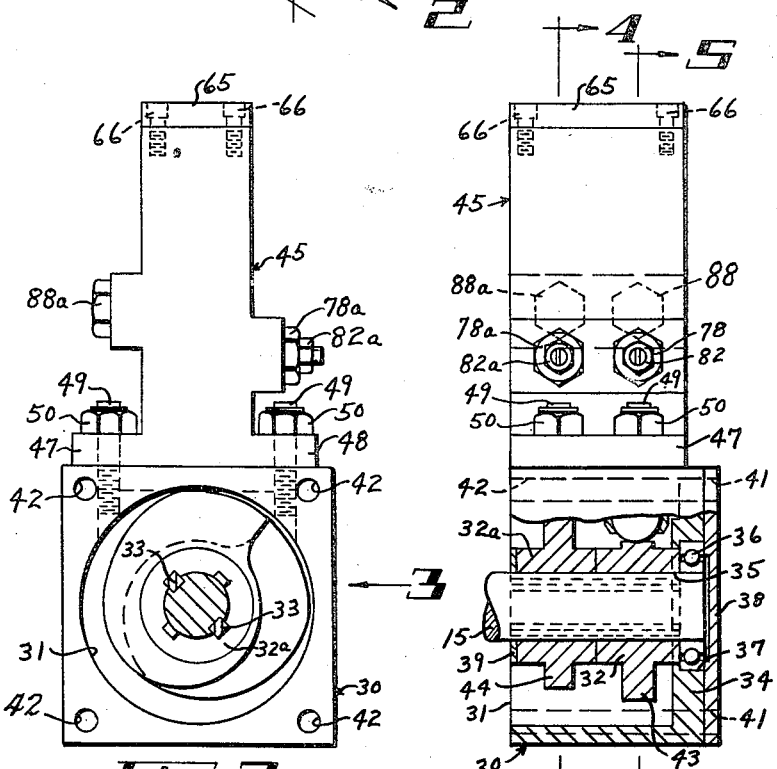
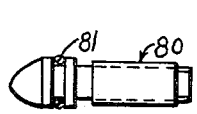
INVENTOR.
EDWARD F. PAULUS
BY
Donnelly, Mentag & Harrington
ATTORNEYS June 21, 1960     E. F. PAULUS     2,941,513

SPEED CONTROL FOR OSCILLATING HYDRAULIC MOTORS

Filed March 28, 1957     2 Sheets-Sheet 2

INVENTOR.
EDWARD F. PAULUS

BY Donnelly, Mentag & Harrington

ATTORNEYS

United States Patent Office 2,941,513
Patented June 21, 1960

2,941,513

SPEED CONTROL FOR OSCILLATING HYDRAULIC MOTORS

Edward F. Paulus, Detroit, Mich., assignor, by mesne assignments, to Roto-Tork Manufacturing Co.

Filed Mar. 28, 1957, Ser. No. 649,170

7 Claims. (Cl. 121—38)

This invention relates to a speed control apparatus capable of controlling the speed of rotation of an oscillating rotary fluid motor.

At the present time, oscillating fluid motors are used in industry for many purposes, as for example, for rotating workpieces, lifting, tumbling, agitating and numerous other operations wherein a rotary motion is required. It is desirable in many instances when carrying out such operations that the speed of rotation of the operation be controlled. Accordingly, it is the primary object of this invention to provide a speed control apparatus adapted to be used with any conventional oscillating rotary fluid motor, whereby, an accurate and predetermined control may be effected over the speed of rotation of an operation being performed by an oscillating rotary fluid motor.

It is a further object of this invention to provide a speed control apparatus for an oscillating rotary fluid motor which is simple and compact in construction, economical of manufacture, and efficient and positive in operation.

It is a still further object of this invention to provide a rotary speed control apparatus for an oscillating rotary fluid motor which is adapted to be easily and quickly connected to any conventional oscillating rotary fluid motor and which may be readily adjusted for any desired rotary cycle speed.

It is another object of this invention to provide a rotary speed control apparatus for an oscillating rotary fluid motor which is adapted to control the rotary cycle speed of the motor in both directions of rotation, whereby, the rotary cycle speed may be controlled to be the same in both directions or be different in each direction.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a perspective view of a rotary speed control apparatus made in accordance with the principles of the invention and showing the apparatus attached to an oscillating rotary fluid motor;

Fig. 2 is an end elevational view of the rotary speed control apparatus illustrated in Fig. 1, taken along the line 2—2 thereof, and looking in the direction of the arrows;

Fig. 3 is a side elevational view, partially broken away and partially in section, of the structure illustrated in Fig. 2, taken in the direction of the arrow marked "3";

Fig. 7 is an enlarged side elevational view of the needle part of the needle valve employed in the invention; and Fig. 8 is an enlarged sectional view of the seal nut of the needle valve employed in the invention.

Figure 6:
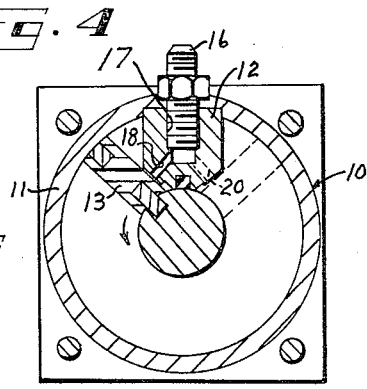
Fig. 6 is an elevational sectional view of the oscillating rotary fluid motor illustrated in Fig. 1, taken along the line 6—6 thereof, and looking in the direction of the arrows.

Referring now to the drawings wherein is shown an illustrative embodiment of the invention and, in particular to Figs. 1 and 6, the reference numeral 10 indicates generally a typical oscillating rotary fluid motor which may be controlled by the speed control apparatus of the present invention. The fluid motor 10 comprises a casing 11 in which is fixedly mounted the stator member 12 and in which is rotatably mounted the rotor member 13. The rotor member 13 is provided with the outwardly extended output shafts 14 and 15. As shown in Fig. 6, a first fluid tube fitting 16 is mounted through a suitable aperture in the casing 11 and is threadably mounted in the hole 17 in the stator 12. The port 18 communicates the hole 17 with the interior of the casing 11 on one side of the stator 12. A second fluid tube fitting 19, as indicated in Fig. 1, is similarly mounted in the casing 11 and the stator 12 and communicates with the interior of the casing 11 on the other side of the rotor 13 by means of the port 20.

The fluid tube fittings 16 and 19 are connected by means of the tubes 21 and 22, respectively, to a conventional directional flow control valve 23 which is in turn connected by the tube 24 to a conventional fluid pump 25 which is driven by a suitable motor as 26. The pump 25 is connected by means of the supply line or tube 27 to the usual fluid reservoir 28. The flow control valve 23 is connected to the fluid reservoir 28 by means of the return line or tube 29. The aforedescribed oscillating fluid motor 10 is illustrative of the conventional type of oscillating fluid motor which may be controlled by the speed control apparatus of the present invention and an oscillating fluid motor of this type is illustrated in detail in my co-pending United States patent application, Serial No. 649,047, filed March 28, 1957. It will be understood, of course, that the speed control apparatus of the present invention may be used to control the rotary speed of other types of oscillating rotary fluid motors than the one generally illustrated in this application.

As shown in Figs. 1, 2 and 3, the speed control apparatus of the present invention comprises a cam housing, generally indicated by the numeral 30. The housing 30 is open on one end thereof, as at 31, and this end is adapted to be mounted on one end of the fluid motor 10 and to receive one of the output shafts thereof, as 15. The shaft 15 is adapted to be slidably mounted in the hollow cam shafts 32 and 32a and to be fixedly secured therein by means of suitable lock keys, as 33, whereby the cam shafts will rotate with the output shaft 15 of the fluid motor 10. The other end of the cam housing is enclosed by the wall 34 which is provided with a centrally disposed opening 35 therethrough through which the outer end of the shaft 15 extends. A roller bearing 36 is operatively mounted in the recess 37 which is formed in the outer face of the wall 34 and the outer end of the shaft 15 is journalled in the roller bearing 36 which is retained in place by means of the bearing retainer plate 38. A spacer member 39 is mounted around the shaft 15 and abuts the outer face of the cam shaft 32a so as to properly space it from the face of the fluid motor to which the speed control apparatus is to be attached. The cam housing 30 is attached to the fluid motor 10 by means of a plurality of bolts as 40 which are adapted to pass through the apertures 41 in the bearing retaining plate 38 and the holes 42 in the cam housing 30. The bolts 40 are adapted to be threadably mounted in the adjacent end of the fluid motor casing.

As shown in Fig. 3, a first cam 43 is integrally mounted on the cam shaft 32 and this cam is adapted to control the rotary speed of the fluid motor during the forward or advance travel movement. A second cam 44 is integrally mounted on the cam shaft 32a and is adapted to control the rotary speed of the fluid motor during the reverse or the retraction movement. As shown, the cams 43 and 44 are constructed the same in shape and size although they are reversed in position on the cam shafts 32 and 32a, so that they provide the same speed control for the fluid motor during the forward and reverse movements.

Figures 4, 5:
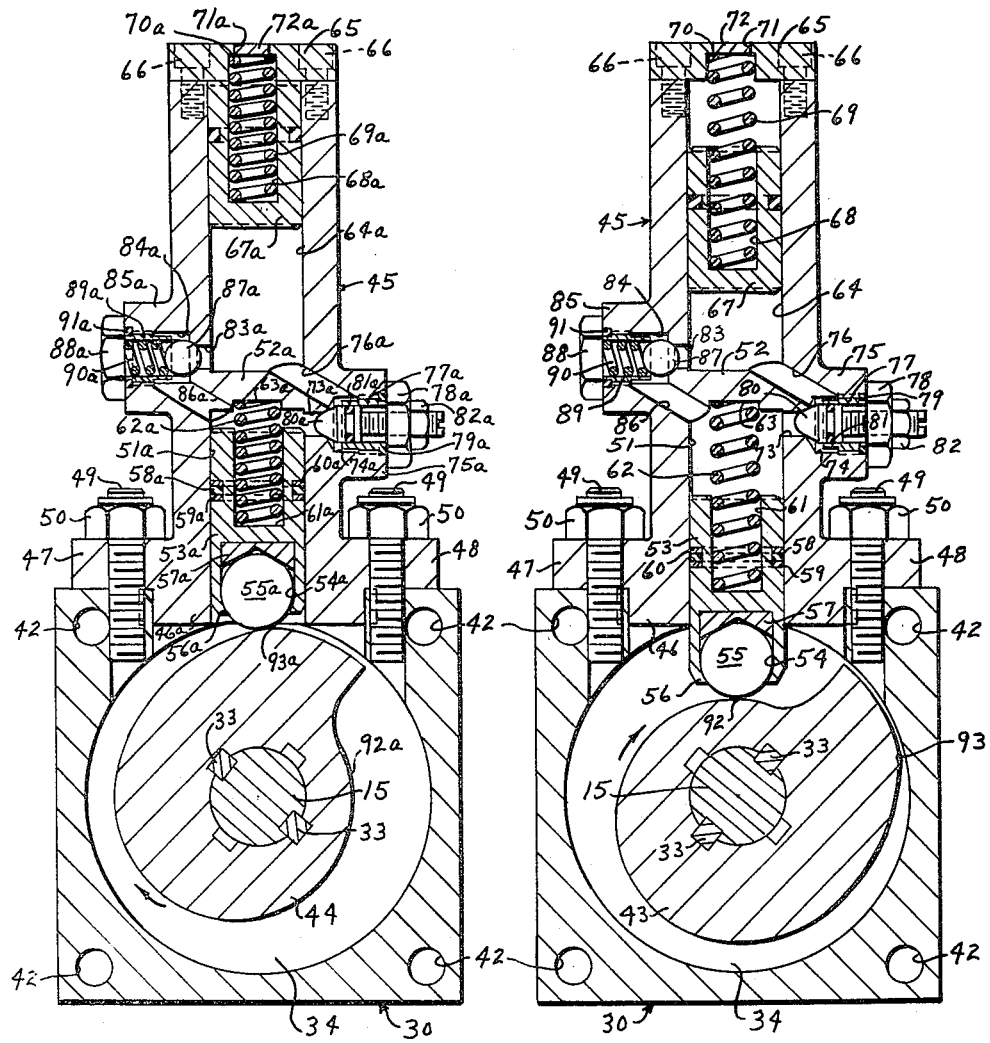
Fig. 4 is an elevational sectional view of the structure illustrated in Fig. 3, taken along the line 4—4 thereof, and looking in the direction of the arrows.
Fig. 5 is an elevational sectional view of the structure illustrated in Fig. 3, taken along the line 5—5 thereof, and looking in the direction of the arrows.

The numeral 45 indicates generally a dashpot housing which is adapted to be fixedly mounted on the upper side of the cam housing 30. As shown in Figs. 4 and 5, the dashpot housing 45 is provided with a downwardly projecting boss 46 which is adapted to be slidably received in the upper open end of the cam housing 30. The dashpot housing 45 is provided with the outwardly extended flanges 47 and 48 on the opposite sides thereof which are adapted to seat on the upper face of the cam housing 30. A plurality of studs 49 are threadably mounted in the cam housing 30 and extend upwardly through suitable apertures in the flanges 47 and 48. The dashpot housing 45 is fixedly secured on the cam housing 30 by means of the studs 49 and the lock nuts 50.

The dashpot housing 45 carries two similar control dashpot means which are each disposed directly above one of the control cams 43 and 44. Since the control dashpot means are similar in structure and operation, the structure of one will be explained in detail and the structure of the other will be marked with corresponding reference numerals followed by the small letter "a." As shown in Fig. 5, the control dashpot means which is operated by the cam 43 comprises a circular cam piston cylinder or chamber 51 which is open at the lower end thereof and which is closed at the upper end thereof by the dividing wall 52. The lower open end of the cam piston cylinder 51 communicates with the interior of the cam housing 30. Slidably mounted in the cam piston cylinder 51 is a cam piston 53 which is provided on the lower end thereof with an inwardly extended axial recess or chamber 54 in which is operatively mounted the cam ball 55. The lower edge of the cam piston cylinder surrounding the recess 54 is peened inwardly, as indicated by the numeral 56, so as to retain the cam ball 55 in the recess 54. A cam ball bearing 57 is mounted in the upper end of the recess 54 and operatively engages the cam ball at the upper side thereof. A fluid seal ring 58 is operatively mounted between the two back-up rings 59 and 60 in a suitable peripheral groove in the outer surface of the cam piston 53. The sealing ring 58 may be made from any suitable fluid seal material. Formed in the upper end of the cam piston 53 is an elongated inwardly extended axial hole 61 in which is adapted to be seated the lower end of the coil spring 62. The upper end of the coil spring 62 is operatively mounted in the recess 63 which is formed in the lower face of the dividing wall 52. The coil spring 62 functions to normally bias the cam piston 53 downwardly, whereby the cam ball 55 is maintained in an operative rolling engagement with the outer peripheral cam surface of the cam 43.

A circular oil retaining cylinder or chamber 64 is formed in the upper end of the dashpot housing 45. The lower end of the oil retaining cylinder 64 is enclosed by the dividing wall 52 and the open upper end is enclosed by the detachably mounted end cap 65 which is secured in place by means of the retainer screws 66. An oil retaining piston 67 is slidably mounted in the cylinder 64 and is provided with an inwardly extended elongated axial aperture 68 in the upper end thereof which is adapted to operatively receive the lower end of the coil spring 69. The upper end of the spring 69 is adapted to be seated in the recess 70 which is formed in the inner surface of the end cap 65. The spring 69 is adapted to normally bias the oil retaining piston 67 downwardly. An aperture 71 is formed through the end cap 65 and a suitable breather cap 72 is operatively mounted therein. A suitable hydraulic oil is used to fill the cam piston cylinder 51 and the oil retaining cylinder 64 and this oil is adapted to be transferred back and forth between the cylinders by means of the following described structure.

As shown in Fig. 5, a first passage 73 connects the upper end of the cam piston cylinder 51 to the needle valve chamber or cylinder 74 which is formed in the outwardly extended integral boss 75 on the side of the dashpot housing 45. A second passage 76 connects the needle valve chamber 74 to the lower end of the oil retaining cylinder 64. A needle valve retainer sleeve 77 carrying the integral nut 78, is threadably mounted in the chamber 74 in the boss 75, and Fig. 8 shows an enlarged view of this structure. A ring seal 79, made from any suitable sealing material, is operatively mounted around the needle valve retainer sleeve 77 to prevent leakage thereby. As best seen in Figs. 5 and 7, a round nose valve needle 80 is threadably mounted in the sleeve 77 and is provided with the peripherally disposed ring seal 81 which is made from any suitable sealing material. The valve needle 80 is adapted to be secured in any desired axially adjusted position by means of the lock nut 82. The valve needle 80 is adapted to meter the flow of oil from the cam piston cylinder 51 to the oil retaining cylinder 64 when the cam piston 53 is moved upwardly by the cam 43.

The hydraulic oil is adapted to be transferred from the oil retaining cylinder 64 back to the cam piston cylinder 51 by means of the following described structure. The lower end of the oil retaining cylinder 64 is connected by means of the third passage 83 to a ball check valve cylinder or chamber 84 which is formed in the integral outwardly extended boss 85 on the side of the dashpot housing 45. The ball check valve cylinder 84 is connected from the lower side thereof to the upper end of the cam piston cylinder 51, by means of the fourth passage 86. The third passage 83 is adapted to be normally closed off by means of the check ball 87. Threadably mounted in the ball check cylinder 84 is a check valve retainer member 88 which is provided with an integral inwardly extended sleeve 89 in which is seated a spring 90 which functions to abut the outer face of the check ball 87 and to normally bias it into an operative engagement with a suitable valve seat formed on the outer end of the passage 83. A ring seal 91 is operatively mounted around the sleeve member 89 to prevent leakage thereby. The check ball 87 may be moved away from its seat to allow oil to flow from the oil retaining cylinder 64 to the cam piston cylinder 51 when a predetermined pressure is created in the cylinder 64. The amount of pressure necessary to move the check ball 87 away from its seat is determined by the compression strength of the coil spring 90. The cam 44, as shown in Fig. 4, is adapted to operate a second dashpot control means which is constructed the same as the aforedescribed dashpot means of Fig. 5 and, accordingly, the dashpot means of Fig. 4 has been marked with corresponding reference numerals followed by the small letter "a." The control dashpot means of Fig. 5 is shown in a starting position and the control dashpot means of Fig. 4 is shown in the end point or finish point of its travel.

In the use of the speed control apparatus of the present invention, and as illustrated herein, the operation of said apparatus will be explained by assuming that the stator 13 of the oscillating rotary fluid motor 10 is in the starting position, as shown in solid lines in Fig. 6. The flow control valve 23 is actuated to admit fluid under pressure to the fluid tube fitting 16 and into the hole 17 and through the port 18 and against the rotor 13. At this point, the control cams 44 and 43 will be in the positions shown in Figs. 4 and 5, respectively. The cam ball 55 will be at the starting position 92 on the cam 43 and the cam ball 55a will engage the cam 44 at the finish position indicated by the numeral 93a. As the rotor 13 is moved in the counter clockwise direction, as viewed in Fig. 6, the cams 43 and 44 will be rotated in the clockwise direction, as viewed in Figs. 4 and 5. The cams 43 and 44 are constructed to a substantially harmonic curve, or to any other speed curve which is desired to be duplicated to give the cam balls 55 and 55a a predetermined movement in their respective cylinders in accordance with the degrees of rotative movement of the cams. The fluid motor shown in the drawings is adapted to oscillate through a rotary travel of 280 degrees.

As the rotor 13 moves from the solid line position shown in Fig. 6, to the dotted line finish position shown in Fig. 6, the cam 43 moves the cam piston 53 upwardly or inwardly of the cylinder 51 against the pressure of spring 62. The starting position of the cam ball 55 on the cam 43 is indicated by the numeral 92 and the finish position of the cam ball 55 relative to the cam 43 is indicated by the numeral 93. The inward movement of the cam piston 53 forces the oil from the cam piston cylinder 51 through the passage 73 and past the metering valve needle 80 which permits a predetermined amount of oil to flow through the passage 76 and into the oil retaining cylinder 64. As the oil is transferred into the oil retaining cylinder 64 the piston 67 will be moved upwardly against the pressure of spring 69. When the rotor 13 has reached the finish point against the stator 12, the cam piston 53 and the oil retaining piston 67 will be in the positions shown in Fig. 4 and at this point the bulk of the oil will be transferred to the oil retaining cylinder 64. When the cam 43 is advancing to the position indicated by the cam 44 in Fig. 4, the cam 44 is retracting from the end-point 93a to the starting point 92a to a position identical to that shown by the cam 43 in Fig. 5. During the retractive movement of the cams 43 and 44, the spring 62 moves the cam piston 53 outwardly and maintains the cam ball 55 in rolling engagement with the cam 43. The spring 69 moves the piston 67 downwardly and forces the oil from the cylinder 64 through the passage 83 and against the valve check ball 87 which is moved backwardly against the spring pressure of spring 90. The oil then flows freely or unrestricted through the passage 86 back to the cam piston cylinder 51. There will also be a small restricted flow of oil back past the valve needle 80.

It will be seen that the cam 44 operates its control dashpot means in the same manner as was described above for the cam 43 but the cam 44 and its control dashpot means is operative on the return or reverse movement of the rotor 13 from the dotted line position to the solid line position, as shown in Fig. 6. The cams 43 and 44 may be formed to suit any desired speed curve. In the illustrated embodiment the cams 43 and 44 are adapted to give the cam pistons 53 and 53a a vertical rise every 5 degrees of rotation of .010 of an inch for the first 250 degrees of travel from the starting points 92 and 92a, respectively. The last 30 degrees of rotation produce a sharper vertical rise in the cam pistons 53 and 53a. During the last 30 degrees of rotation of the complete 280 degrees forward travel of the cams 43 and 44, the cam pistons 53 and 53a are moved .032 of an inch for every 5 degrees of rotation. The sharper or increased rate of rise during the last 30 degrees of forward travel functions to decelerate the rotor 13 without undue shock to the motor, and provides a cushioning effect.

It will be seen that the speed of the rotor 13 is thus accurately controlled throughout the forward and reverse movements. In the embodiment shown, the cams 43 and 44 are made to the same shape, however each cam may be shaped differently so as to produce different speeds for the forward and reverse movements of the rotor 13. The overall rotary speed control provided by the invention is effected by the coaction of the cams moving the cam pistons at a predetermined rate of rise whereby the oil is forced from the cylinder 51 past the metering valve 80 and into the oil retaining cylinder 64.

While it will be apparent that the preferred embodiment of the invention herein disclosed is well calculated to fulfill the objects above stated, it will be appreciated that the invention is susceptible to modification, variation and change without departing from the proper scope of fair meaning of the subjoined claims. As for example, instead of using two of the novel dashpot means for controlling the speed of rotation of a fluid motor in both directions of rotation, only one dashpot means could be used to provide a braking action to control the speed of rotation in one direction.

What I claim is:

1. A speed control apparatus for an oscillating fluid motor having an output shaft comprising: a housing adapted to be mounted on said motor and to receive said output shaft; a cam shaft rotatably mounted in said housing and adapted to be connected to said output shaft for rotation therewith; a pair of cams mounted on said cam shaft; said cams being mounted in positions reverse to each other; a dashpot housing mounted on said first named housing; a pair of rotary speed control fluid dashpot means mounted in said dashpot housing and being separately operable by one of said pair of cams; and, means for controlling the rate of operation of said fluid dashpot means.

2. A speed control apparatus for an oscillating fluid motor having an output shaft comprising: a housing adapted to be mounted on said motor and to receive said output shaft; a cam shaft rotatably mounted in said housing and adapted to be connected to said output shaft for rotation therewith; a pair of cams mounted on said cam shaft; said cams being mounted in positions reverse to each other; a dashpot housing mounted on said first named housing; a pair of rotary speed control fluid dashpot means mounted in said dashpot housing and being separately operable by one of said pair of cams; each of said rotary speed control fluid dashpot means including a first chamber and a second chamber; a cam piston slidably mounted in said first chamber; means for biasing said cam piston downwardly against one of said pair of cams; said chambers being filled with a hydraulic fluid; a second piston slidably mounted in said second chamber; means for normally biasing said second piston downwardly; a first passage means and a second passage means connecting said chambers; a first flow valve and a second flow valve for controlling the flow of fluid through said first and second passage means; said cam piston being slidable upwardly when actuated by said one of said pair of cams when it is rotated in one direction and being operative to force the fluid from said first chamber through said first passage means and into said second chamber, and said second piston being adapted to force the fluid back through the second passage means to said first chamber during the period when said one of said cams is rotated in the other direction.

3. The invention as defined in claim 2, wherein: said first flow valve comprises a needle valve adapted to permit a restricted flow of fluid through said first passage in both directions and said second flow valve comprises a ball check valve adapted to permit free flow through said second passage in one direction.

4. For use in combination with an oscillating fluid motor having an output shaft, a speed control apparatus for controlling the speed of rotation of said motor comprising: a housing adapted to be mounted on said motor and to receive said shaft: a cam in said housing adapted to be fixedly mounted on said output shaft for rotation therewith; a dashpot housing mounted on a side of said first named housing; a first cylinder formed in said dashpot housing and having one end thereof open and in communication with said first named housing; a first piston slidably mounted in said first cylinder; a cam ball operatively mounted in the outer end of said first piston and adapted to ride on the periphery of said cam; a first spring operatively mounted in said first cylinder for biasing said first piston toward said cam to maintain said cam ball in operative engagement with said cam; said first cylinder being filled with a hydraulic fluid; a second enclosed cylinder formed in said dashpot housing; a second piston slidably mounted in said second enclosed cylinder; a second spring operatively mounted in said second enclosed cylinder for biasing said second piston toward one end of said second enclosed cylinder; a first passage means and a second passage means connecting said cylinders; a metering valve in said first passage means for metering the flow of fluid between said cylinders; a check valve in said second passage means for allowing fluid to flow in one direction only from said second cylinder to said first cylinder; and, the periphery of said cam being formed to a predetermined curve, whereby, when the motor shaft is rotated throughout its travel in one direction, the cam will move said first piston inwardly of said first cylinder against the opposing pressure of said first spring and the fluid in said first cylinder, and, the fluid will be forced out of said first cylinder at a restricted rate of flow past said metering valve and through said first passage means into said second cylinder, whereby, the speed of rotation of said motor shaft will be controlled in one direction of rotation, and the second piston in said second cylinder will be moved against the pressure of said second spring toward the other end of said second cylinder, and, when said motor shaft is rotated in the other direction, said second spring will move the second piston toward said one end of the second cylinder to force the fluid at an unrestricted rate of flow past said check valve and through said second passage means back into said first cylinder.

5. For use in combination with an oscillating fluid motor having an output shaft, a speed control apparatus for controlling the speed of rotation of said motor comprising: a housing adapted to be mounted on said motor and to receive said shaft; a pair of cams in said housing adapted to be fixedly mounted on said output shaft for rotation therewith; a dashpot housing mounted on a side of said first named housing; a pair of first cylinders formed in said dashpot housing with each having one end thereof open and in communication with said first named housing; a first piston slidably mounted in each of said first cylinders; a cam ball operatively mounted in the outer end of each of said first pistons; each of said cam balls being adapted to ride on the periphery of one of said cams; a first spring operatively mounted in each of said first cylinders for biasing said first pistons toward said cams to maintain said cam balls in operative engagement with said cams; one of said first cylinders being filled with a hydraulic fluid; a pair of second enclosed cylinders formed in said dashpot housing; a second piston slidably mounted in each of said second enclosed cylinders; a second spring operatively mounted in each of said second enclosed cylinders for biasing said second pistons toward one end of said second enclosed cylinders; one of said second cylinders being filled with a hydraulic fluid a first passage means and a second passage means connecting each of said first and second cylinders; a metering valve in each of said first passage means for metering the flow of fluid between each of said first and second cylinders; a check valve in each of said second passage means for allowing fluid to flow in one direction only from each of said second cylinders to each of said first cylinders; and, the periphery of each of said cams being formed to a predetermined curve and being disposed in the reverse position relative to each other, whereby, when the motor shaft is rotated throughout its travel in one direction, one of the cams will move one of said first pistons inwardly of one of said first cylinders against the opposing pressure of one of said first springs and the fluid in one of said first cylinders, and, the fluid will be forced out of the corresponding first cylinder at a restricted rate of flow past the corresponding metering valve and into one of said second cylinders by means of one of said first passage means so as to move the second piston therein against the pressure of the second spring therein, whereby the speed of rotation of said motor shaft will be controlled in one direction of rotation, and simultaneously the second piston in the second cylinder filled with fluid will be moved by means of the pressure of the second spring therein toward said one end thereof to force the fluid therein out at an unrestricted rate of flow past the check valve in the corresponding second passage means back into the corresponding first cylinder, and, when said motor shaft is rotated in the other direction, the aforegoing controlling action will be effected in the same manner but in the opposite order and the motor shaft will be controlled in the other direction of rotation.

6. For use in combination with an oscillating fluid motor having an output shaft, a speed control apparatus for controlling the speed of rotation of said motor comprising: a housing adapted to be mounted on said motor and to receive said shaft; a pair of cams in said housing adapted to be fixedly mounted on said output shaft for rotation therewith; a dashpot housing mounted on a side of said first named housing; a pair of first pistons slidably mounted in said dashpot housing and being in operative engagement with said pair of cams; each of said first pistons being adapted to force a hydraulic fluid from a first cylinder to a second cylinder when it is actuated by its respective cam and at a restricted rate of flow, whereby, a braking action is impressed on the motor shaft during rotation thereof for controlling the rate of rotation of said shaft; a spring biased second piston in each of said second cylinders adapted to force the fluid back to each of said first cylinders at an unrestricted rate of flow when the first pistons are not being actuated by their respective cams; and, one of said cams being adapted to actuate one of said first pistons when the motor shaft is rotated in one direction, and, the other of said cams being adapted to actuate the other of said first pistons when the motor shaft is rotated in the other direction.

7. For use in combination with an oscillating fluid motor having an output shaft, a speed control apparatus for controlling the speed of rotation of said motor comprising: a housing adapted to be mounted on said motor and to receive said shaft; a pair of cams in said housing adapted to be fixedly mounted on said output shaft for rotation therewith; a dashpot housing mounted on a side of said first named housing; a first and second pair of cylinders in said dashpot housing; a pair of first pistons slidably mounted in said pair of first cylinders; said pair of cams being in operative engagement with said pair of first pistons for moving them in said first cylinders; passage means for connecting each of said first cylinders with one of said second cylinders; each of said first pistons being adapted to force a hydraulic fluid from a first cylinder to a second cylinder when it is actuated by its respective cam and at a restricted rate of flow, whereby, a braking action is impressed on the motor shaft during rotation thereof for controlling the rate of rotation of said shaft; a spring biased second piston slidably mounted in each of said second cylinders adapted to force the fluid back to each of said first cylinders at an unrestricted rate of flow when the first pistons are not being actuated by their respective cams; and, one of said cams being adapted to actuate one of said first pistons when the motor shaft is rotated in one direction, and, the other of said cams being adapted to actuate the other of said first pistons when the motor shaft is rotated in the other direction.

References Cited in the file of this patent

UNITED STATES PATENTS 2,132,721   Clarke ---------------- Oct. 11, 1938
2,701,448   Johnson --------------- Feb. 8, 1955